US008766876B2

(12) United States Patent  (10) Patent No.: US 8,766,876 B2
Seo  (45) Date of Patent: Jul. 1, 2014

(54) PROJECTOR FOR ADVERTISING IMAGES

(76) Inventor: Yong Jae Seo, Gyeongsangnam-do (KR)

( * ) Notice: Subject to any disclaimer, the term of this patent is extended or adjusted under 35 U.S.C. 154(b) by 150 days.

(21) Appl. No.: 13/522,454

(22) PCT Filed: Jan. 19, 2011

(86) PCT No.: PCT/KR2011/000385
§ 371 (c)(1),
(2), (4) Date: Jul. 16, 2012

(87) PCT Pub. No.: WO2011/090312
PCT Pub. Date: Jul. 28, 2011

(65) Prior Publication Data
US 2012/0299800 A1    Nov. 29, 2012

(30) Foreign Application Priority Data
Jan. 25, 2010    (KR) .................. 10-2010-0006406

(51) Int. Cl.
*G09G 5/00*    (2006.01)
(52) U.S. Cl.
USPC ............................................ 345/1.1; 345/1.3
(58) Field of Classification Search
USPC .................... 345/1.1, 1.2, 1.3, 7–9
See application file for complete search history.

(56) References Cited

U.S. PATENT DOCUMENTS

| 6,986,581 B2 * | 1/2006 | Sun et al. ................. 353/31 |
| 2008/0012996 A1 * | 1/2008 | Choi ....................... 348/744 |
| 2008/0297726 A1 * | 12/2008 | Rodriguez et al. ......... 353/13 |
| 2011/0131522 A1 * | 6/2011 | Nagai ..................... 715/772 |

FOREIGN PATENT DOCUMENTS

| JP | 05-058287 | * | 9/1993 | ............ G09F 9/00 |
| KR | 10-2002-0047769 A | | 6/2002 | |
| KR | 10-2007-0003423 A | | 1/2007 | |

* cited by examiner

*Primary Examiner* — Duc Dinh
(74) *Attorney, Agent, or Firm* — Rabin & Berdo, P.C.

(57) ABSTRACT

The present invention relates to a projector for outputting advertisement images, and it is an aim of the present invention to provide a projector for advertisement images which can project advertisement images onto surfaces of windows in a train. For this purpose, the projector of the present invention comprises: an image-processing unit installed in the engine room of the train to play back advertisement images; image distribution units installed in the respective passenger cars of the train to receive the advertisement images by communicating with the image-processing unit; and a plurality of image output(display) units arranged at a predetermined interval and close to the windows in the passenger cars so as to output, onto the windows, the advertisement images transmitted from the image-processing unit and received by the image distribution units, such that the advertisement images can be projected onto the surfaces of the windows.

6 Claims, 4 Drawing Sheets

PROJECTOR FOR ADVERTISING IMAGES

TECHNICAL FIELD

The present invention relates, in general, to a projector system for an advertising image and, more particularly, to a projector system for an advertising image which projects an advertising image onto windows of respective passenger cars of a subway train.

BACKGROUND ART

Modern people living along with appearance of numerous companies, the release of various products, and the spread of a variety of information have obtained a diversity of information through a variety of media.

For example, people can get a variety of information through broadcasting information which is provided by a television or radio receiver, through the billboards which is installed on an outer wall of a building in the street, or through other means. Recently, since a diversity of advertisements are posted outside the public transportation such as subway, bus, taxi, etc, people can access to a variety of information while using the public transportation.

In the meantime, since the public generally uses such public transportation, a variety of information providing means utilizing public transportation has recently been developed.

That is, since a diversity of advertisements are attached both inside and outside the public transportation, and monitors displaying moving picture or texts thereon are also mounted inside the public transportation, people can access to a variety of information while using the public transportation.

However, since conventional advertising media using public transportation are arranged at positions (e.g., for the subway, the central section of a passage, an upper portion above a shelf, etc.) with which it is difficult for passengers to make their eyes contact, the passengers have to turn their eyes to those places in order to see the advertising media, resulting in problems of providing the passengers in the narrow space of the public transportation with inefficient advertising.

In the meantime, as one way to solve such a problem, a method is provided in which LCD monitors are arranged in a tunnel, through which a subway train passes, such that when a subway train enters the tunnel, advertisements are projected onto windows of the subway train from the monitors so that passengers in the subway train who keeps an eye on the windows can simply watch the advertisements without separate efforts.

However, such a method has problems in that it is difficult to identify the advertisements at high speed of the train, images are not clear, a variety of images cannot be provided, and the maintenance fee is high.

DISCLOSURE

Technical Problem

Accordingly, the present invention has been made keeping in mind the above problems occurring in the related art, and the present invention is intended to propose a projector system for an advertising image capable of projecting an advertising image onto an exposed surface of windows inside a train.

Technical Solution

In order to achieve the above object, according to one aspect of the present invention, there is provided a projector system for an advertising image, the projector system includes: an image processing unit provided in an engine room of a train; a plurality of image distribution units provided in respective passenger cars of the train to receive and distribute the advertising image by communication with the image processing unit; and a plurality of image display units disposed at certain distances in the proximity of windows inside the passenger car so as to output and display the advertising images transmitted from the image processing unit onto exposed surfaces of the windows.

Advantageous Effects

As set forth foregoing, according to the present invention, an advertising image is projected on an exposed surface of windows inside a train, having excellent effects of allowing passengers, who use public transportation, to simply watch the advertising image.

Further, a variety of information such as subway stations, transfer routes and transfer gates, emergency situations in a subway station, special weather reports, or the like are instantly provided to the passengers through images, having the effects of improving user's convenience in use and of providing public service advertisement or promotional advertisement with e.g. station building, thereby contributing to public services.

Further, instead of fixed images in the form of paper or a picture frame, moving image advertisement and advertisement with surroundings in the vicinity of a subway station are variably provided, thereby improving the efficiency of advertisement and informing passengers of a variety of information as well, contributing to an increase in the passengers using the subway.

Furthermore, if public transportation stops operating owing to a power failure, corresponding notification concerned on the power failure is displayed through advertising images, which also serve to illuminate the inside of the power-failed public transportation.

MODE FOR INVENTION

Reference will now be made in greater detail to a preferred embodiment of the invention, an example of which is illustrated in the accompanying drawings.

Figure 1:
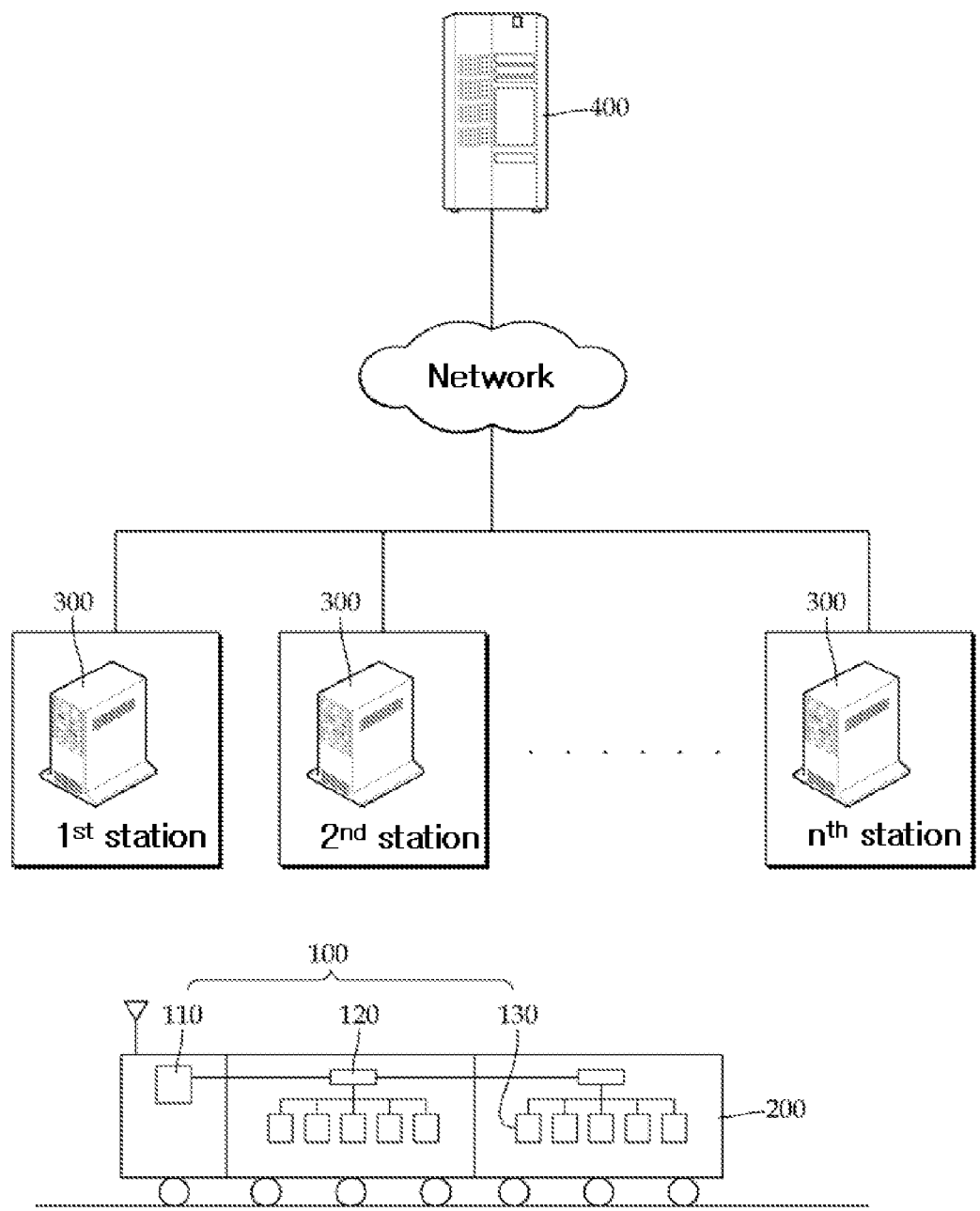
FIG. 1 is a view showing the construction of an embodiment of a subway system to which the present invention is adapted.

FIG. 1 is a view showing the construction of an embodiment of a subway system to which the present invention is adapted.

A subway train (hereinafter referred to as a 'train') moving along an underground railroad has an engine room to which a plurality of passenger cars is connected. The respective passenger car has on both sides a plurality of doors, through which passengers go in and out, and between which passenger seats, in which passengers can seat, are attached to the inner walls, with windows disposed at a constant level and regular distances on the sides of the inner wall above the seats. Since the height of the window is made higher than the passenger sitting on the seat, when the passenger sits on the seat, most surfaces of the windows (referred hereinafter to as an 'exposed surface of window') are exposed above the height of the passenger sitting on the seat. Thus, if there are not many passengers in the passenger car, passengers sitting on the seats generally stare at the exposed surface of the windows on the opposite side, whereas if the passenger car is so crowded that some passengers stand inside the car, the standing passengers go to their destination holding on to the strap while generally staring at the exposed surfaces of the windows.

In addition, also in case of public transportation such as a bus, other than a train, in rush hour, the bus is crowded with passengers so that many passengers have to go to their destination keeping standing while staring at the exposed surfaces of the windows for a long time.

That is, the present invention is to output a variety of kinds of advertising images onto the exposed surfaces of the windows of public transportation, at which many passengers would stare, so that many passengers can go to their destination while watching the advertising images in a comfortable position.

While the present invention is applicable to public transportation such as trains and buses as previously mentioned, the present invention will be hereinafter described with reference to a train as an example. That is, the present invention can also be applied to public transportation such as a bus without departing from the scope of the present invention. Therefore, the term "train" used herein not only refers in the narrow sense to a subway train that transports passengers while moving along the undersurface route, but also refers in the broad sense to other public transportation such as a train, a bus, etc.

Further, the term "advertising image" used herein may refer to an image for conventional promotion of goods, a public service advertisement, operation information of a subway train indicating operating status of a subway train (subway stations, the direction of an opening door, etc.), an advertisement for promotion of respective subway stations, a broadcasting signal from a broadcasting station, or the like.

In the meantime, a shown in FIG. 1, a subway system to which the present invention is adapted includes a main server 400 which is provided in e.g. a main subway station, a plurality of relay servers provided in respective subway stations, and a claimed projector system 100 for an advertising image which is provided in a subway train 200.

The main server 400 serves to produce and store an advertising image, which is output by the claimed projector system for an advertising image, and transmit it to the respective subway trains. The main server may use a server that is currently available on a network such as Internet. That is, the main server may receive advertising images, which are produced by many advertising agents, through offline input device or through a network, and store them, and is configured to transmit them to the subway trains via the relay server. In addition, the main server may transmit not only advertising images, but also an advertising schedule, including e.g. advertising time, kinds of advertising images, an ID number of a target train to which an advertising image is output, or the like, to the relay server.

The relay servers 300 which are provided in and managed by respective subway stations are a server that receives the advertising images from the main server, and transmits them to the projector systems provided in the respective trains. Since the relay server has to transmit the advertising images from the main server to the respective projector systems of the trains, which are passing through a subway station, particularly via wireless communication, the relay server is equipped with wireless devices for wireless communication. Such wireless devices may include a conventional device such as Bluetooth or wireless Internet that is available on a wireless network, so a detailed description thereof will be omitted. In the meantime, the projector system for an advertising image which is provided in a train is also provided with a communication unit that is able to communicate with the above-mentioned wireless devices.

However, the advertising images are not transmitted to the projector systems of the operating trains essentially through the relay servers. For example, when a train finished its operating and arrived at the terminal station, if a relay server of the terminal station was equipped with such wireless devices, the projector system can receive and store advertising images via the wireless devices while the train is stopped in the terminal station. In this case, when the train operates again, the projector system need not communicate with the relay servers provided in respective stations to receive advertising images. Here, the advertising images may also be downloaded to the projector system by a wired connection between the relay server and the projector system, or otherwise by a portable storage medium, or the like.

In the meantime, in the case where the relay serves provided in respective subway stations transmit in real time advertising images, which are transmitted from the main server, to the projector system, or otherwise the terminal station collectively downloads the advertising images to the projector system, the relay servers of respective stations can transmit not only advertising images, but also one for promotion of the corresponding station or a breaking news (which is also one of advertising images) transmitted from the main server, to the projector system of the train passing through the corresponding station, via the wireless devices. In this case, the projector system may also output the advertising images, which were transmitted from the relay server of the station, while the train is passing through or being stopped in the corresponding station.

That is, an advertising image output through a projector system of a train may be one that is transmitted in real time from a main server and a relay server to the projector system, that when the train starts operating, is collectively downloaded and stored in the projector system, or otherwise that is autonomously produced by the relay server of respective station and transmitted to the projector system in real time.

In the meantime, an advertising schedule by which the projector system outputs the advertising images received via a variety of paths can be determined by the setting on a software program driving the projector system. A control signal for this setting may be sent from the main server or the relay server, or otherwise may be set by a manager for the projector system.

The projector system 100 is a system for outputting the advertising images collected by the above-mentioned process to exposed surfaces of windows provided in a train 200. The projector system includes an image processing unit 110 which is provided in an engine room, a plurality of image distribution units which is provided in respective passenger cars of a train, the image distribution units being connected with the image processing unit via a wired or wireless connection, and a plurality of image display units which outputs advertising images, transmitted from the image distribution unit, to exposed surfaces of windows in the train. The projector system 100 will now be described in detail with reference to FIGS. 2 to 4.

Figure 2:
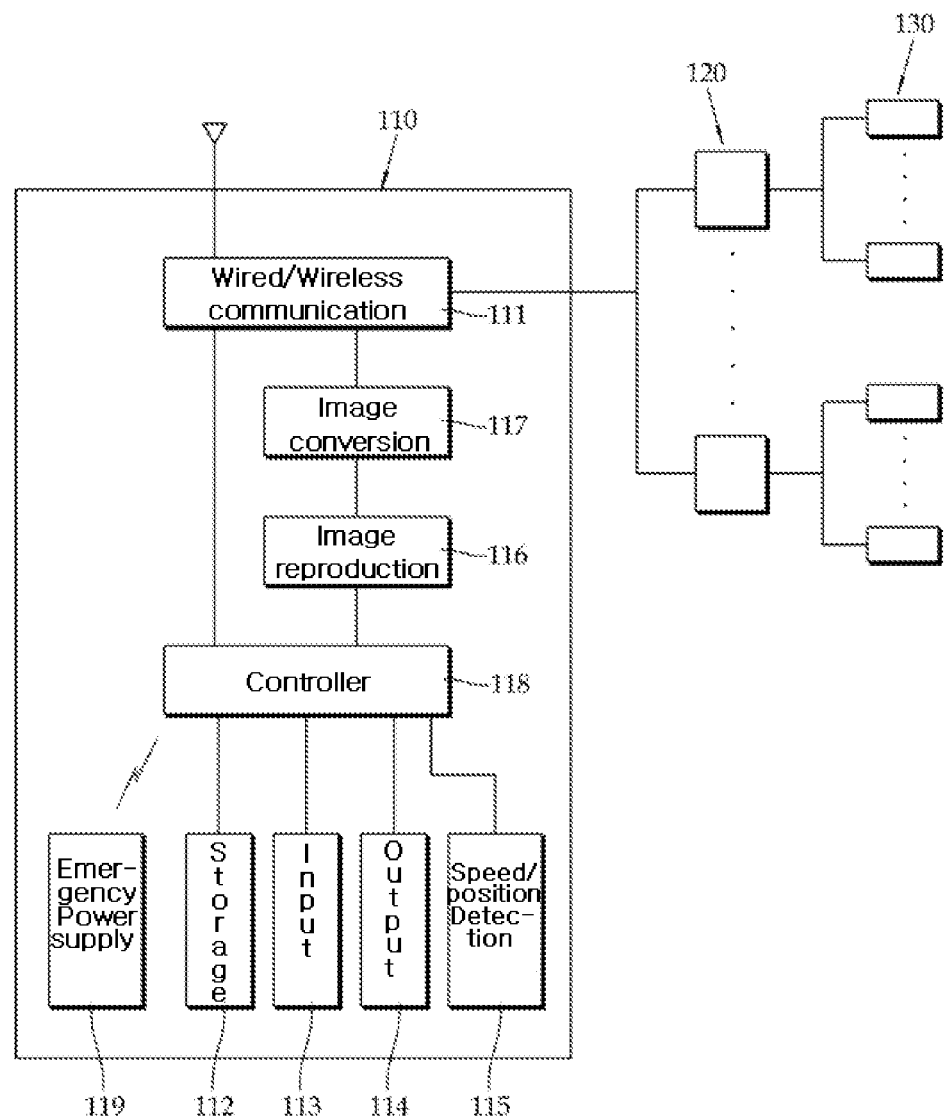
FIG. 2 is a view showing a projector system for an advertising image according to an embodiment of the present invention.

FIG. 2 is a view showing a projector system for an advertising image according to an embodiment of the present invention.

As previously set forth, the projector system includes the image processing unit 110, the image distribution units 120, and the image display units 130. Here, the image processing unit, the image distribution units (signal relay units) of the respective passenger cars, and the image display units may be connected to each other via a wired or wireless connection.

First, the image processing unit 110 installed in an engine room serves to manage an advertising image and to transmit the advertising image to the image display units via the image distribution units. To this end, as shown in FIG. 2, the image processing unit includes a communication section 111 for communication with external devices, a storage section 112 for storing an advertising image, an input section 113 for receiving a variety of information from a manager (an engineer or an image processing operator), a display section 114 for displaying the operating state of the image processing unit, a speed/position detection section 115 for detecting a speed and position of a train, an image reproduction section 116 for reproducing an advertising image, an image conversion section 117 for converting the advertising image reproduced by the image reproduction section to clearly display the advertising image on the exposed surfaces of windows, an emergency power supply section 119 for supplying emergency power, and a controller 118 for controlling functions of the former elements.

The communication section 111 serves to communicate with the relay servers or image distribution units. As described above, the projector system can receive an advertising image from a relay server, or receive information about a subway station where a relay server is located, from the relay server, via wireless communication, so that the communication section performs wireless communication with the relay server. In addition, the communication section communicates with the image distribution units so as to transmit the advertising image reproduced by the image processing unit to the image distribution units which are provided in the respective passenger cars. Here, communication with the image distribution units is performed via wired or wireless communication, so that the communication section may be equipped with a variety of devices for wired or wireless communication. The communication section may have a plurality of allowable frequency ranges in order to perform wireless communication with the plurality of image distribution units. The communication section communicates with the controller for a train so as to collect operation information of a train such as a position or speed of the train. Matters relevant to the information about the position and speed of the train will be specified in detail through a description of the controller 118 and the speed/position detection section 115 which will be described below.

The storage section 112 is provided to store a variety of programs for performing a function of the image processing unit, and particularly functions to store an advertising image transmitted from the communication section and the input section.

The input section 113 is a section through which a manager can input a control signal for performing a variety of functions of the image processing unit, so that it may include a variety of buttons, a touch screen, or the like. Further, the input section may be configured to receive an advertising image via communication with a portable storage medium (USB memory, CD, external hard disk, etc.), and the advertising image input via the input section may be stored and managed in the storage section, like the advertising image input via the communication section. The construction of the input section for performing such a function may be realized through the communication section.

The display section 114 serves to output a variety of functions of the image processing unit in order for a manager in the engine room to monitor the operation state of the image processing unit.

The image reproduction unit 116 serves to reproduce an advertising image in the form of a file stored in the storage section and output it as an image.

The image conversion section 117 serves to convert the advertising image reproduced by the image reproduction section such that the advertising image is normally output to the exposed surfaces of windows in the passenger car. That is, in order to allow passengers to clearly watch the advertising image projected on the exposed surfaces of windows, the advertising image displayed from the image display section needs to be perpendicular to the exposed surface of the window. However, since the image display sections are positioned on a shelf or the ceiling above the exposed surfaces of the windows, the advertising image is forced to project slantly at a certain angle to the exposed surface. In this case, an image distortion occurs in the advertising image, so that passengers have only to watch distorted or unclear advertising image projected on the exposed surfaces of the windows. Thus, the image conversion section previously corrects such blurring or distortion of the advertising image output from the image display section in consideration of an angle and a distance between the image display sections and the exposed surfaces of the windows. That is, the image display section corrects the blurring or distortion of the advertising image, which occurs when the image is projected slantly at a certain angle, and sends the corrected image to the image distribution sections of the respective passenger cars. Thus, the actual advertising image which is output from the image display section and is projected on the exposed surface of the window can be normally displayed on the exposed surface as projected from the straight front side, so that passengers can watch the advertising image without blurring or distortion.

The controller 118 serves to control the functions of the variety of elements of the image processing unit. Further, the controller can also control the display state of the advertising image using the information about the operation of a train which is collected from the communication section. For example, the advertising image projected on the exposed surface of the window may be seen more clearly when a train moves along a dark route such as a tunnel, rather than along a bright route such as a platform of a station or a route over the ground. In this case, the controller may be configured such that when the train is entering the platform, the controller performs control action to stop outputting the advertising image, and when the train is entering the tunnel, the controller performs control action to start outputting the advertising image, using the operation information of the train which was collected. Alternatively, the controller may control the output of the advertising image using the speed of the train which is collected from the operation information of the train. That is, since when a train approaches a platform or moves from the platform towards a tunnel, the speed of the train decreases or increases, the controller may detect such a variation in speed and determine whether or not to output an advertising image. The reason for controlling whether or not to output an advertising image is because an advertising image is output onto the exposed surface of the window when a train operates at a certain speed, so that passengers can concentrate their attention on the advertising image. For example, when passengers get on and off the train when it arrived at a platform, the advertising image is not seen clearly because of bright light of the platform and the passengers cannot concentrate their attention on the advertising image because the inside of the passenger car becomes complicated as many passengers get on and off the passenger car. In this case, it is preferred that the advertising image be not output. In the meantime, such a problem of the clearance of the advertising image varying according to the brightness of the surrounding of the train may be properly resolved by applying an optical reflective film such as a polyester film, e.g. Mylar, onto the exposed surface of the window in order to provide the exposed surface with anti-reflection, allowing the advertising image to be seen clearly. Beside, the controller can control the output of the advertising image using a variety of conditions.

The speed/position detection section 115 serves to detect the speed and position of a train. While the speed and position of the train may be analyzed by a control unit for controlling the operation of the train, and then transmitted to the image processing unit 110 via the communication section, they may be directly detected by a speed/position detection section equipped in the image processing unit. Further, the speed/position detection section may receive the speed and position of the train from a control unit for controlling the operation of the train, and then transmit them to the controller.

The emergency power supply section 119 is a section that when power supply to a train is interrupted, supplies power to the image processing unit 110, the image distribution units 120, and the image display units 130. Thus, even when a power failure occurs so that a train stops operating, the image processing unit, the image distribution units, and the image display units can be driven by the action of the emergency power supply section, so that an emergency alert or an announcement for the power failure can be output, and emergency lighting can also be provided in order for passenger to secure a minimum sight.

Next, the image distribution unit 120 serves to receive an advertising image via the communication with the image processing unit and transmit the image to the multiple image display units. That is, in case of a train such as a subway train, the train includes a plurality of passenger cars connected together, and the respective passenger car may be provided with a plurality of image display units, so that according to the present invention, the advertising image reproduced by the image processing unit is first transmitted to the image distribution units of the respective passenger cars, which in turn transmit the advertising image to the plurality of image display units in the passenger cars. Specifically, respective passenger car may include at least one image distribution unit, to which a plurality of image display units may be connected. Here, communication between the image processing unit and the image distribution unit or between the image distribution unit and the image display unit may be performed via wired or wireless connection. Meanwhile, in case of other public transportation which is not composed of a plurality of passenger cars, an advertising image may be transmitted by direct connection between an image processing unit and an image display unit without an image distribution unit.

Next, the image display unit 130 may be mounted on a shelf or the ceiling of a train, and serves to output the advertising image, which was transmitted from the image distribution unit, onto the exposed surface of the window. The image display unit may be configured into a variety of forms according to a user's demand. Particularly, the image display unit may be formed as a color LED pico-projector, a projection distance of which is 1.5 m at most, so that an effective projection area thereof can be the whole or upper part of the exposed surface of the window.

Figure 3:
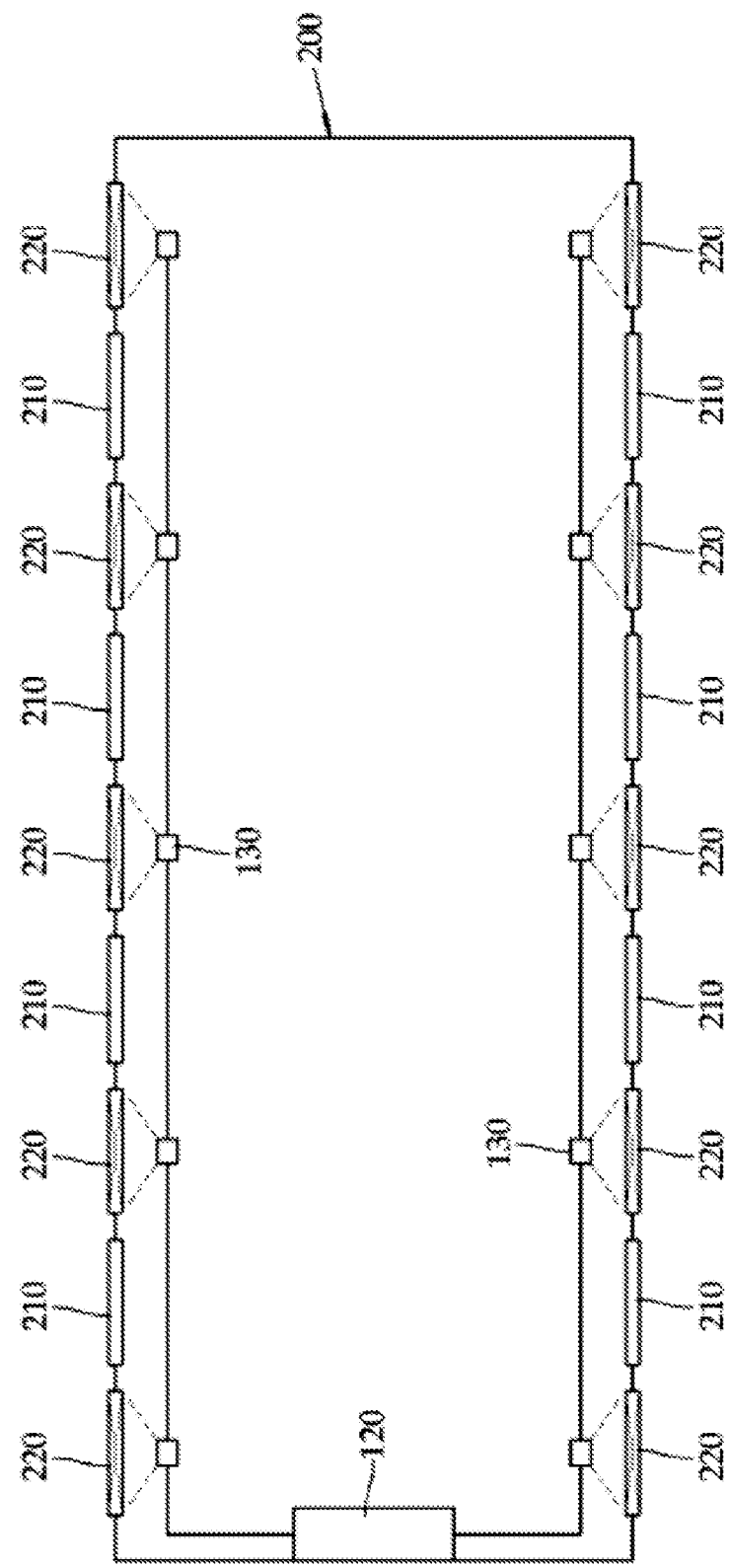
FIG. 3 is a plan view showing a passenger car in which image display units and image distribution units are mounted in the projector system for an advertising image according to the present invention.
Figure 4:
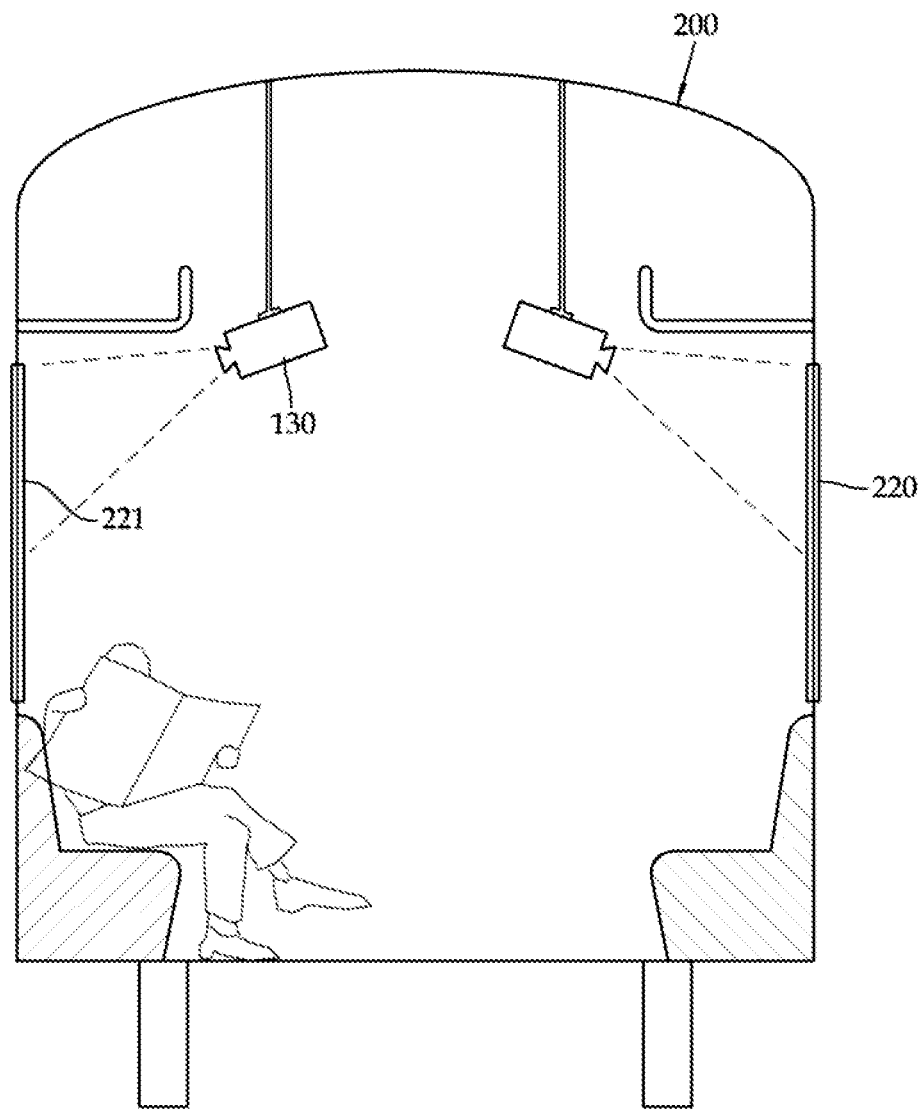
FIG. 4 is a view showing the inside of a passenger car in which image display units are mounted in the projector system for an advertising image according to the present invention.

FIG. 3 is a plan view showing a passenger car in which image display units and image distribution units are mounted in the projector system for an advertising image according to the present invention, and FIG. 4 is a view showing the inside of a passenger car in which image display units are mounted in the projector system for an advertising image according to the present invention.

As set forth foregoing, the projector system of the invention includes the image processing unit, the image distribution units, and the image display units.

Particularly, the image distribution unit 120, as shown in FIG. 3, is mounted for each passenger car, and to which a plurality of image display units 130 may be connected. Alternatively, the respective passenger car may be provided with one or more image distribution units, each connected with a plurality of image display units. Further, the image distribution units mounted in the respective passenger cars may be separately connected with the image processing unit, and may also be sequentially connected with each other via a single line.

Further, as shown in FIG. 3, the image display unit may comprise at least one unit between doors 210 of a train. Here, one image display unit can output an advertising image onto the exposed surface of at least one window 220. That is, the number and position of the image display units can be diversely set according to a distance between doors of a train and a projection range of the image display units. Further, as shown in FIG. 4, the image display unit 130 may be connected to the ceiling 230 or a shelf 240 of a train.

Meanwhile, the exposed surface 221 of the window is positioned between an upper portion of a seat and the shelf, so that when taking account of heights of passengers and the position of a strap, the image display unit has only to be mounted at a level above the exposed surface of the window. However, in this case, burring or distortion of an advertising image may occur. In the present invention, in order to prevent such burring or distortion of the advertising image from occurring, as previously discussed, the image conversion section predicts such burring or distortion of an advertising image to occur and previously corrects the reproduced advertising image.

A description will now be made of a method of outputting an advertising image using a projector system in accordance with another aspect of the present invention.

First, an advertising image can be transmitted to an image processing unit in a variety of manners. For example, if a train moves along respective stations, the advertising image is transmitted from the main server to the relay servers of the respective stations, and then transmitted to the image processing unit via communication with the respective relay servers, or otherwise the advertising image is transmitted from the main server to the image processing unit via direct communication therebetween. Further, if a train moves along respective stations, an advertising image autonomously manufactured by the respective stations is transmitted to the image processing unit via communication with relay servers of the respective stations. Further, if the train finishes its operation and stops at the terminal station, an advertising image transmitted from the main server to the relay servers is transmitted to the image processing unit via communication with the corresponding relay servers, or otherwise is transmitted to the image processing unit by a portable storage medium or via a wired connection with a relay server. Beside, the image processing unit may receive an advertising image by a variety of methods, and the transmitted advertising image is stored and managed in a storage section.

Display time of an advertising image onto an exposed surface of a window can be controlled by a controller. That is, the controller can output the advertising image according to the set information about the speed of a train, places such as a tunnel, the ground, or a platform where a train is currently positioned, and if the train is positioned on the ground, current time, operation schedule of the train, and the like.

Kinds of output advertising images can also be controlled in a diversity of forms by the controller. That is, the controller may perform control action to sequentially output only advertising images which are transmitted from the main server, and if the train enters a platform of a station while the corresponding advertising images from the main server are being output, an advertising image for promotion of the corresponding station (e.g. indicating the direction toward which a door is opened or closed, promoting the corresponding station, etc.) may be output. Further, the controller may perform control action to first output an emergency story received, or an advertising image received from a broadcasting station.

The controller of the image processing unit may perform control action to transmit different kinds of advertising images to respective passenger cars, so that different advertising images may be output for respective passenger cars. That is, in case where the image distribution units provided in the respective passenger cars have their own ID numbers, or where the image processing unit and the respective image distribution units communicate with each other using separate frequencies, the image processing unit and the image distribution units can transmit/receive advertising images via individual communication, so that the controller may carry out control action to output different advertising images to the respective passenger cars according to a predetermined schedule. For example, if a train includes a women-only passenger car, advertising images to be output from the corresponding women-only car may be special advertising images for women. Further, if the image distribution units and the image display units are also configured to communicate with each other via individual communication, the controller may perform control action such that for example, the image display units which are associated with the exposed surfaces of the windows above the seat for the old and the infirm output an advertising image promoting giving place to elderly people, so that passengers sitting on the seats for the older and the firm can offer their seats to the old and the firm.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A projector system for an advertising image, the projector system comprising:
   an image processing unit provided in an engine room of a train to reproducing an advertising image;
   a plurality of image distribution units provided in respective passenger cars of the train to receive the advertising image via communication with the image processing unit; and
   a plurality of image display units disposed at certain distances in the proximity of windows inside the passenger car and outputting and displaying the advertising images, transmitted from the image processing unit and received by the image distribution units, onto exposed surfaces of the windows,
   wherein the image processing unit includes
      a communication section communicating with a server or the image distribution units to receive, at the image processing unit, the advertising image or transmit the advertising image to the image distribution units, respectively,
      an input section through which a variety of information, the advertising image, and a command signal from a manager are input,
      an image reproduction section reproducing the advertising image received via the communication section or through the input section,
      an image conversion section correcting the advertising image reproduced by the image reproduction section, using an angle and a distance between the exposed surface of the window and the image display unit, and
      a controller controlling the advertising image output from the image conversion section to be transmitted to the image distribution units via the communication section.

2. The projector system as set forth in claim 1, wherein the communication section receives the advertising image via wireless communication with a relay server provided in a train station or a bus station.

3. The projector system as set forth in claim 1, wherein the image processing unit further comprises a speed/position detection section detecting the speed and position of the train, and
   wherein the controller determines whether or not to output the advertising image, using information about the speed and position of the train determined by the speed/position detection section.

4. The projector system as set forth in claim 1, wherein the controller performs control action to transmit different advertising images to the respective image display units.

5. The projector system as set forth in claim 1, wherein the image display unit is mounted on a ceiling or a shelf inside the train at a level above the exposed surface of the window.

6. The projector system as set forth in claim 1, wherein the image processing unit further comprises an emergency power supply section designed, upon a power failure of the train, to supply power to the image processing unit, the image distribution units, and the image display units.

* * * * *